US009036315B2

(12) United States Patent
Johnson, Jr.

(10) Patent No.: US 9,036,315 B2
(45) Date of Patent: *May 19, 2015

(54) HIGH VOLTAGE ELECTRONIC SWITCHES FOR CONTROLLING DIRECT CURRENT ARCS IN HIGH VOLTAGE DIRECT CURRENT SYSTEMS AND METHODS OF OPERATING THE SAME

(71) Applicant: Eaton Corporation, Cleveland, OH (US)

(72) Inventor: Robert William Johnson, Jr., Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,072

(22) Filed: May 2, 2014

(65) Prior Publication Data

US 2014/0240879 A1    Aug. 28, 2014

Related U.S. Application Data

(63) Continuation of application No. 13/221,019, filed on Aug. 30, 2011, now Pat. No. 8,717,728.

(60) Provisional application No. 61/378,672, filed on Aug. 31, 2010.

(51) Int. Cl.
  *H02H 3/08* (2006.01)
  *H02H 9/02* (2006.01)
  *H02H 9/00* (2006.01)
  *H02H 9/08* (2006.01)

(52) U.S. Cl.
  CPC .............. *H02H 9/025* (2013.01); *H02H 9/004* (2013.01)

(58) Field of Classification Search
  USPC ........................................ 361/93.9
  See application file for complete search history.

(56) References Cited

U.S. PATENT DOCUMENTS

| 5,155,648 A | 10/1992 | Gauthier |
| 7,826,191 B1 * | 11/2010 | Fisher et al. ................ 361/93.1 |
| 8,717,728 B2 * | 5/2014 | Johnson, Jr. ................ 361/93.9 |

(Continued)

FOREIGN PATENT DOCUMENTS

| CN | 1320991 A | 11/2001 |
| EP | 1 150 410 A2 | 10/2001 |

OTHER PUBLICATIONS

Notification of First Office Action, CN 201180041905.8, Jul. 30, 2014.
Notification Concerning Transmittal of International Preliminary Report on Patentability, International Application No. PCT/US2011/049646; Date of Mailing: Mar. 5, 2013; 8 pages.
IBM, "Hot-Plug Circuit", *IBM Technical Disclosure Bulletin*, vol. 34, No. 4A Sep. 1991, 2 pages.

(Continued)

*Primary Examiner* — Dharti Patel
(74) *Attorney, Agent, or Firm* — Myers Bigel Sibley & Sajovec

(57) ABSTRACT

High voltage direct current systems are provided including one or more outlets and an electronic current limiter circuit associated with the one or more outlets. The electronic current limiter circuit is configured to limit current inrush when a connector is plugged into and/or unplugged from the one or more outlets when a direct current bus associated with the one or more outlets is energized so as not to damage the connector; and/or isolate direct current faults and/or excess current draw in a load connected to the one or more outlets so as to protect the system from shutdown.

31 Claims, 12 Drawing Sheets

(56) References Cited

U.S. PATENT DOCUMENTS

2001/0017756 A1 8/2001 Iyoda
2004/0004798 A1 1/2004 Priest

OTHER PUBLICATIONS

International Search Report Corresponding to International Application No. PCT/US2011/049646; Date of Mailing: Dec. 19, 2011; 14 pages.

* cited by examiner

DASHED L NOT SHORTED
SOLID L SHORTED

HIGH VOLTAGE ELECTRONIC SWITCHES FOR CONTROLLING DIRECT CURRENT ARCS IN HIGH VOLTAGE DIRECT CURRENT SYSTEMS AND METHODS OF OPERATING THE SAME

CLAIM OF PRIORITY

The present application is a continuation of U.S. patent application Ser. No. 13/221,019, filed Aug. 30, 2011, which claims priority to U.S. Provisional Application No. 61/378,672, filed on Aug. 31, 2010, the disclosures of which are hereby incorporated herein by reference as if set forth in their entirety.

FIELD

The inventive subject matter generally relates to high voltage direct current distribution and methods, more particularly, high voltage electronic switches for controlling direct current arcs and related methods.

BACKGROUND

High-voltage, direct current (HVDC) electric power transmission systems use direct current for the bulk transmission of electrical power, in contrast with the more common alternating current (AC) systems. HVDC systems may provide the ability to transmit large amounts of power over long distances with lower capital costs and lower losses than AC systems. Thus, HDVC systems may allow efficient use of energy sources remote from load centers. However, HVDC systems may present problems not present in AC systems. For example, unlike AC systems, HVDC system circuit breakers may be difficult to build because some mechanism must typically be included in the circuit breaker to force current to zero, otherwise arcing and contact wear would be too great to allow reliable switching.

SUMMARY

Some embodiments of the present inventive concept provide high voltage direct current systems including at least one outlet; and an electronic current limiter circuit associated with the at least one outlet. The electronic current limiter circuit is configured to limit current inrush when a connector is plugged into and/or unplugged from the at least one outlet when a direct current bus associated with the at least one outlet is energized so as not to damage the connector; and/or isolate direct current faults and/or excess current draw in a load connected to the at least one outlet so as to protect the system from shutdown.

In further embodiments, a power distribution unit is provided including the at least one outlet. In certain embodiments, the at least one outlet may be two or more outlets, each having an associated electronic current limiter circuit.

In still further embodiments, the electronic current limiter circuit may include a metal oxide semiconductor field effect transistor (MOSFET) in series with an inductor between a direct current source and the load. In certain embodiments, responsive to detection of the direct current fault, the MOSFET may be configured to be switched off and the inductor may be configured to be shorted such that a load interruption time caused by extinguishing the direct current fault can be reduced. Responsive to an indication that the direct current fault has been extinguished, the MOSFET may be configured to be switched on and the short may be removed from the inductor.

In some embodiments, the MOSFET may be configured to be on until a fault is detected and to be reset by unplugging the connector from and replugging the connector into the at least one outlet.

In further embodiments, the MOSFET may be configured to be switched off at a first current magnitude threshold and energized at a second current magnitude threshold, lower than the first current magnitude threshold, to limit the peak current to an allowable direct current. In certain embodiments, the MOSFET may be configured to be monitored for desaturation and to be transferred to a switching mode for a predetermined period of time before a fault is signaled.

In still further embodiments, the MOSFET may be configured to be switched off periodically to force a current zero. In certain embodiments, the MOSFET may be configured to be switched off about every 0.1 s for about 10.0 µs.

In some embodiments, the MOSFET may be configured to remain off until a connector is detected in the at least one outlet.

In further embodiments, the MOSFET may be configured to be periodically monitored to determine if the MOSFET has failed. In certain embodiments, the MOSFET may be configured to be periodically monitored from about every 10.0 seconds to about every 1.0 minute.

In still further embodiments, the system may further include a direct current rated relay. When a failure of the MOSFET is detected the load may be de-energized using the direct current rated relay. In certain embodiments, the system may further include at least one direct current rated fuse. The at least one direct current rated fuse may be positioned in series with the MOSFET. The at least one direct current rated fuse may be a pair of direct current rated fuses associated with each of the at least one outlet/electric current limiter circuit pairs.

In some embodiments, the MOSFET may be configured to maintain current inside a curve of the at least one direct current rated fuse to prevent the direct current fuse from opening when the MOSFET is operational.

In further embodiments, the system may be further configured to: monitor a drain to source voltage of the MOSFET; estimate a current level in the MOSFET when the drain to source voltage exceeds a predetermined level, less than the desaturation point; desaturate the MOSFET responsive to a sensed overload based on the estimated current level; trigger a current limiting burst for a predetermined time, the current limiting burst configured such that a direct current fuse associated with the at least one outlet does not open; switch the MOSFET off if the predetermined time is reached; and signal a fault responsive to switching off the MOSFET.

In still further embodiments, the inductor may be from about 2.0 µH to about 40 µH. In certain embodiments, the inductor may be configured to be shorted and the MOSFET may be configured to be opened for about 1.0 to about 4.0 µs when a fault is detected to quench the arc.

In some embodiments, the connector may be configured to be received by the at least one outlet and may include guarded contacts so as to reduce damage to the contacts when the connector is plugged into and/or unplugged from the at least one outlet.

Further embodiments provide high voltage direct current systems including a direct current source having a positive and negative lead; and an electronic current limiter circuit coupled to the positive and/or negative lead of the direct current source. The electronic current limiter circuit includes at least one switch and at least one control circuit. The electronic current limiter circuit is configured to limit current inrush when a connector is plugged into and/or unplugged from at least one outlet when a direct current bus associated with direct current source is energized so as not to damage the connector; and/or isolate direct current faults and/or excess current draw in a load connected to the at least one outlet so as to protect the system from shutdown.

In still further embodiments, the at least one switch may include first and second switches and the at least one control circuit may include first and second control circuits. The first switch and the first control circuit may be coupled to the positive lead of the direct current source. The second switch and the second control circuit may be coupled to the negative lead of the direct current source.

In some embodiments, the system includes at least two devices in series with the load.

Further embodiments of the present inventive subject matter provide methods of controlling arcs in a direct current high voltage system. The method includes limiting current inrush when a device is plugged into and/or unplugged from an outlet when a direct current bus associated with the outlet is energized so as not to damage an associated connector; and/or isolating direct current faults and/or excess current draw in a load connected to the outlet so as to protect the system from shutdown.

DETAILED DESCRIPTION OF EMBODIMENTS

Figure 1:
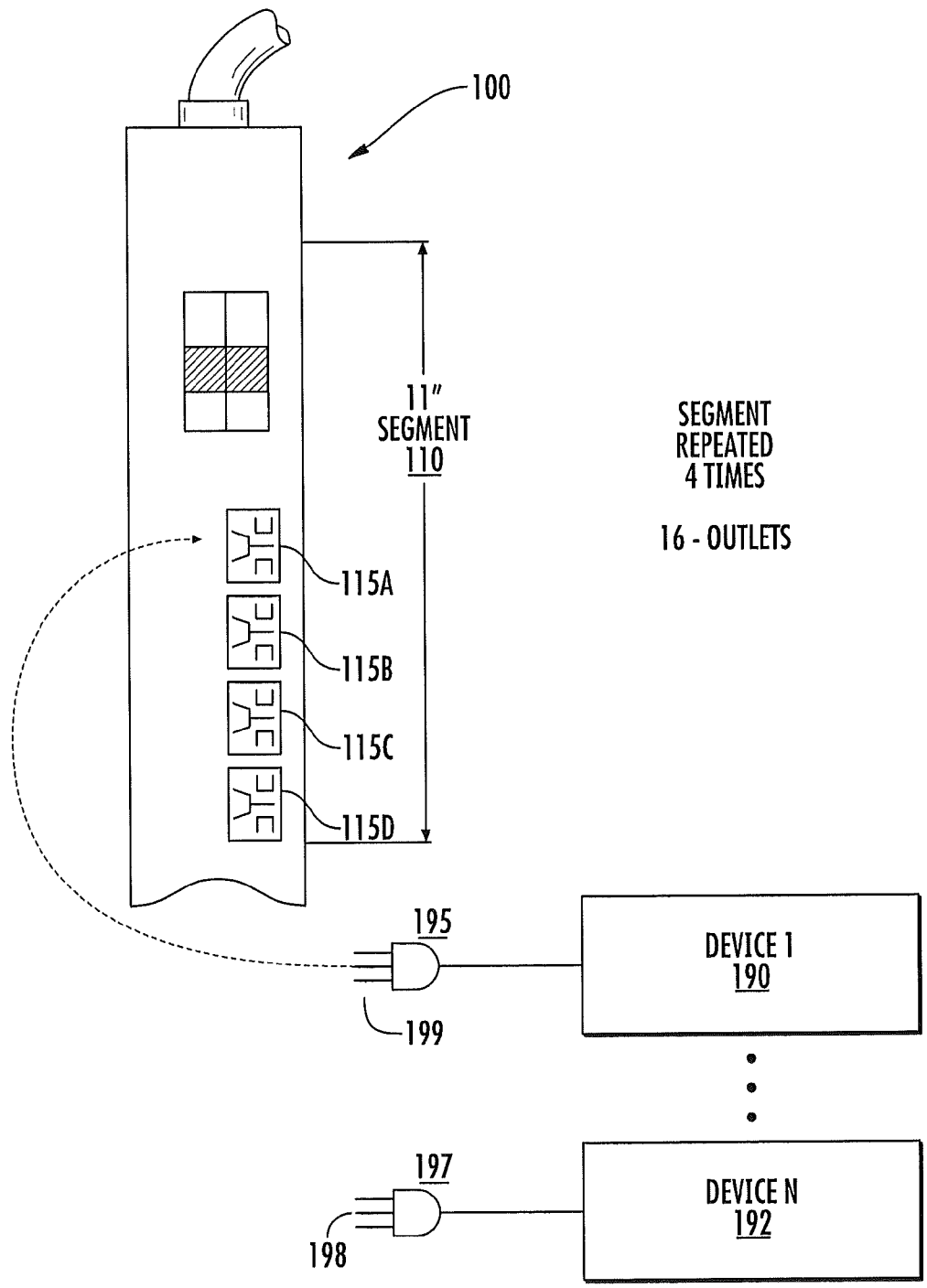
FIG. 1 is a diagram illustrating a top portion of a power distribution unit (PDU) in accordance with some embodiments of the present inventive subject matter.

Specific embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the inventive subject matter may be embodied as systems, methods and computer program products. Some embodiments of the inventive subject matter may include hardware and/or combinations of hardware and software. Some embodiments of the inventive subject matter include circuitry configured to provide functions described herein. It will be appreciated that such circuitry may include analog circuits, digital circuits, and combinations of analog and digital circuits.

Embodiments of the inventive subject matter are described below with reference to block diagrams and/or operational (e.g., flowchart) illustrations of systems and methods according to various embodiments of the inventive subject matter. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

As discussed above, there is an interest in use of high voltage direct current distribution (HVDC) instead of alternating current (AC) current distribution to improve data room efficiency. Using direct current (DC) distribution in the data center or at the rack level may provide the desired increase in efficiency. In some embodiments, the rack-level implementation may provide an AC to DC convertor within the rack. The DC is then distributed to the information technology (IT) equipment. The IT equipment is designed to accept regulated DC input. Typically, the output is from about 300 to about 400 V DC. It would be desirable for the DC distribution system to have the same attachment capability as the existing AC distribution system.

However, use of DC systems may present problems, not presented by AC systems. For example, with an AC fault, the power supply provides sufficient ride through to allow a fuse or circuit breaker to clear and the mains can provide very high fault currents to accelerate protective element clearing. With DC distribution, the fault current is finite and there tends to be less hold up in the downstream power supplies. Without some type of fault isolation, a DC fault could shutdown the system by, for example, notching the DC bus.

Furthermore, system operators typically desire the ability to plug and/or unplug equipment while the bus is energized, i.e. hot plugging equipment is desirable. In an HVDC system, if equipment is plugged and/or unplugged while the HVDC bus is energized, the inrush and arcing may damage normal connectors and/or the system itself.

Accordingly, some embodiments of the inventive subject matter discussed herein provide an HVDC system having hot plug capabilities. Thus, methods and devices discussed herein provide the ability to break DC arcs formed by hot plugging connectors. Furthermore, some embodiments may provide fuse like protection for the connected load and buffering for other loads on the common HV bus under DC fault conditions as will be discussed further herein with respect to FIGS. 1 through 16.

Referring first to FIG. 1, a diagram illustrating a top portion of a power distribution unit (PDU) in accordance with some embodiments of the inventive subject matter will be discussed. The PDU 100 is designed as an accessory to the Power Shelf. Embodiments of the PDU 100 illustrated in FIG. 1 have four protected segments 110 (only one segment 110 is visible in the top view of FIG. 1). Each segment 110 includes four outlets 115A, 115B, 115C and 115D. Thus, each PDU 100 includes four segments 110 and a total of 16 outlets. Each segment 110 may have a finger proof, 2-pole fuse holder. As will be discussed further below, in some embodiments each segment 110 may be protected by a direct current (DC)-rated fuse. The DC-rated fuse may be a 20 to 30 A fuse in some embodiments. In some embodiments, the outlets 115A through 115D in each segment may be an Anderson Power Products® Saf-D-Grid brand DC Receptacle.

It will be understood that although embodiments of the PDU 100 are discussed above as having four segments 110 each having four outlets 115A through 115D, embodiments of the present inventive subject matter are not limited to this configuration. For example, less or more than four segments having less or more than four outlets may be provided on the PDU without departing from the scope of embodiments discussed herein.

Each outlet 115A through 115D of each segment 110 is protected with an electronic current limiter (ECL) circuit in accordance with some embodiments of the present invention. Details with respect to the ECL circuit will be discussed further below with respect to FIGS. 5 through 12. The ECL circuit may be configured to limit current inrush when a connector is plugged into and/or unplugged from one of the outlets 115A-115D when a direct current bus associated with the outlet 115A-115D is energized so as not to damage the connector. The ECL circuit may be further or alternatively configured to isolate direct current faults and/or excess current draw in a load connected to the outlet so as to protect the system from shutdown by notching the DC bus. Isolating direct current faults may also decrease the potential interruption of other parallel connected loads. The losses associated with ECL circuits in accordance with some embodiments are relatively low and are expected to be heat sinked to the PDU case. In some embodiments, the PDU case may be an aluminum extrusion with serrated surface to increase the exterior surface area to aid cooling.

As further illustrated in FIG. 1, one or more devices 190, 192 may be plugged into the outlets 115A-115D. In particular, the connectors 195, 197 associated with the devices 190, 192 may be plugged into the outlets 115A-115D. In some embodiments, the connectors 190, 192 have one or more contacts 199, 198. The contacts may be guarded contacts in some embodiments, which are being discussed further below.

Figure 2:
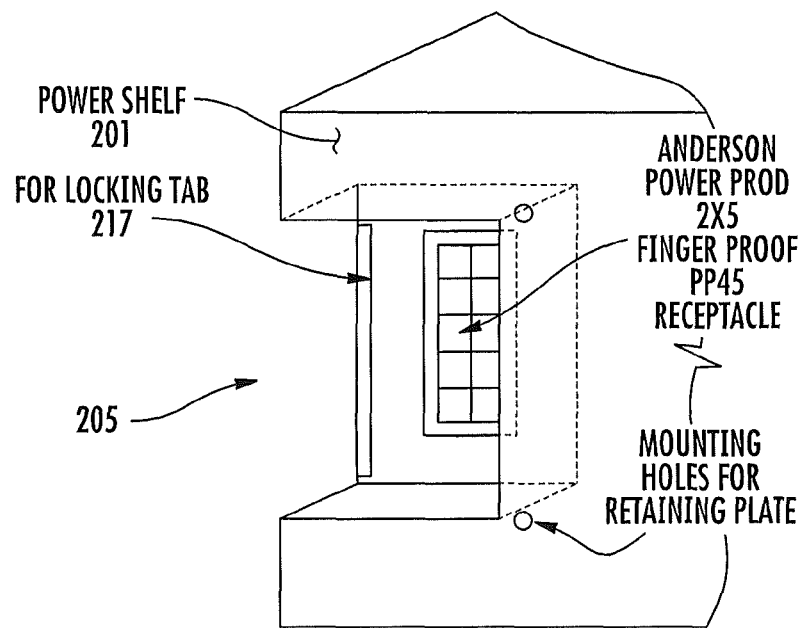
FIG. 2 is a diagram illustrating a mounting assembly for a power shelf in accordance with some embodiments of the present inventive subject matter.

As discussed above, the PDU 100 is designed as an accessory to the Power Shelf. Referring now to FIG. 2, a diagram of an example mounting in the Power Shelf 201 in accordance with some embodiments of the inventive subject matter will be discussed. As illustrated in FIG. 2, the cavity 205 in the Power shelf 201 has a chassis mounted Anderson Power Product 2×5 receptacle. There is a locking tab opening 217 to aid in securing the retaining bracket. The bracket may be secured to the chassis with screws. It will be understood that the diagram of FIG. 2 is provided for exemplary purposes only and, therefore, embodiments discussed herein are not limited to the configuration illustrated therein.

Figure 3:
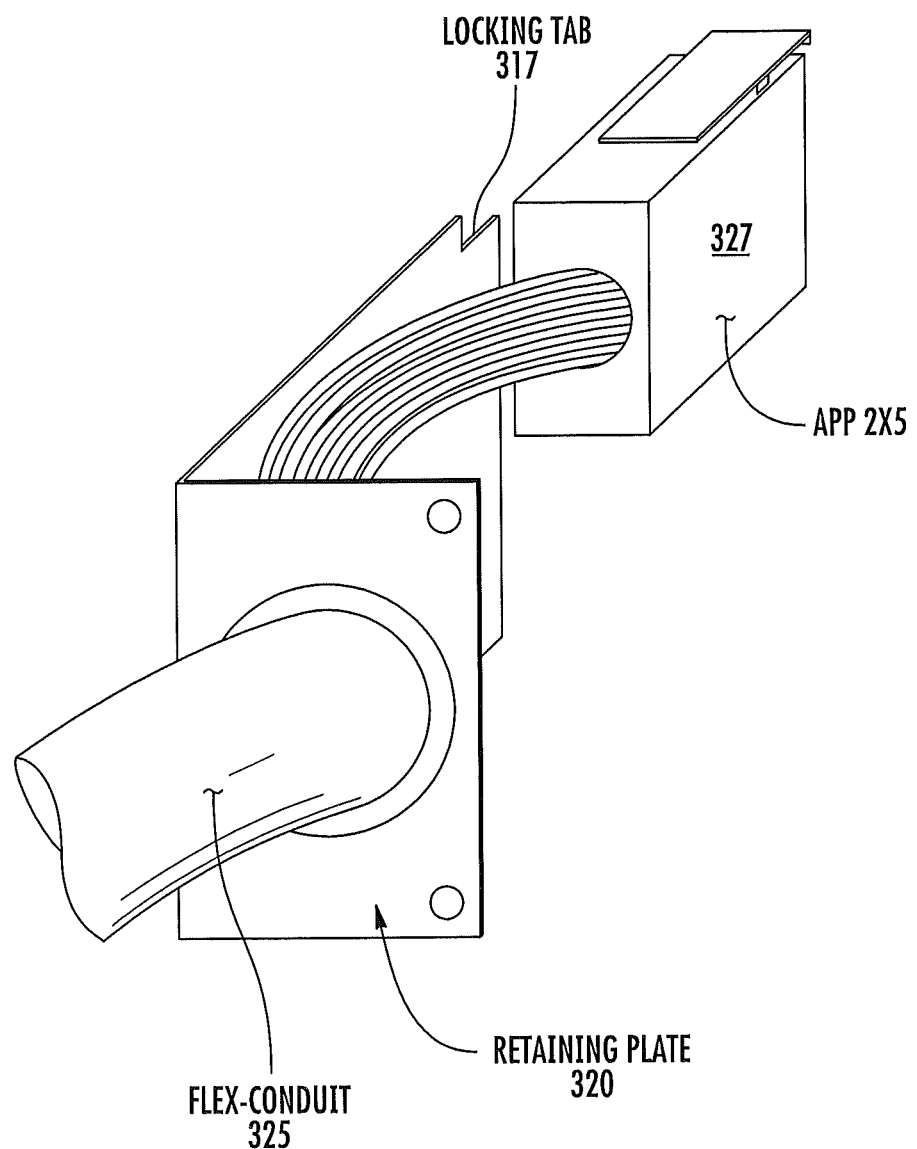
FIG. 3 is a diagram illustrating a cord end of a power distribution unit (PDU) in accordance with some embodiments.

Referring now to FIG. 3, a diagram illustrating a cord end of the PDU 100 (FIG. 1) in accordance with some embodiments will be discussed. As illustrated, the flex-conduit 325 is connected to the retaining bracket 320 with locking tab 317. In some embodiments, the connector 327 may be an Anderson Power Product® PP45 in 2×5 array. It will be understood that the diagram of FIG. 3 is provided for exemplary purposes and, therefore, embodiments discussed herein are not limited to the configuration illustrated therein.

Figure 4:
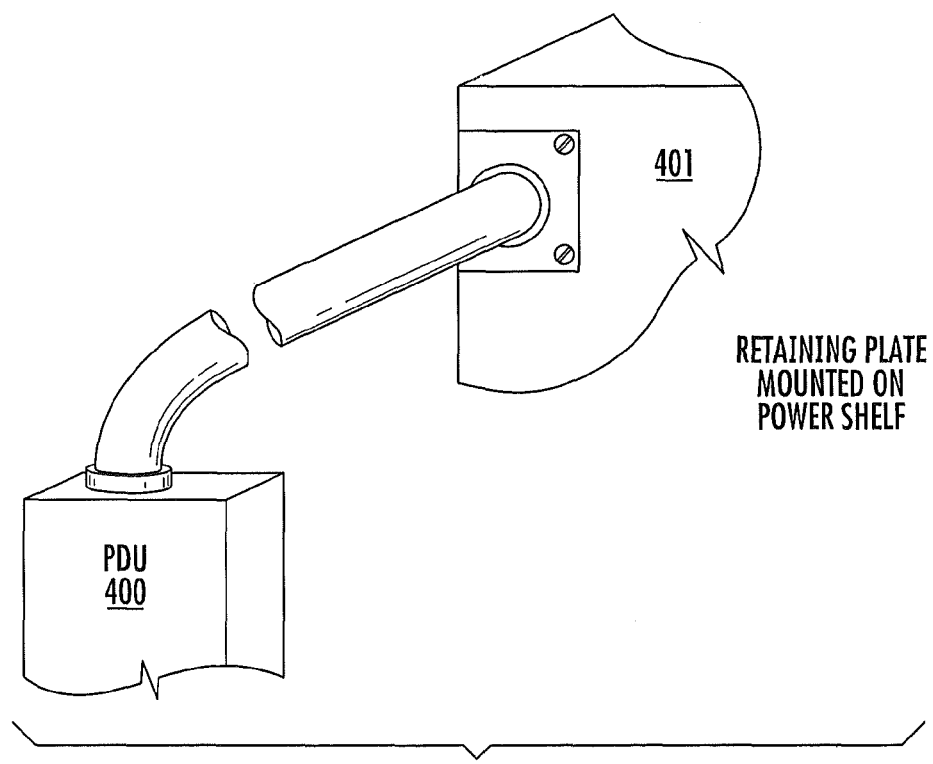
FIG. 4 is a diagram illustrating a cord end of the PDU attached to the power shelf in accordance with some embodiments.

Referring now to FIG. 4, a diagram illustrating a cord end of the PDU 400 attached to the Power Shelf 401 in accordance with some embodiments will now be discussed. The Anderson Power Products® connector is connected to the receptacle and the cover plate it secured in place. It will be understood that the diagram of FIG. 4 is provided for exemplary purposes and, therefore, embodiments discussed herein are not limited to the configuration illustrated therein. It will be further understood that the connector is configured to be received by the outlet and includes guarded contacts so as to reduce damage to the contacts when the connector is plugged into and/or unplugged from one of the outlets 115A through 115D.

Figure 5:
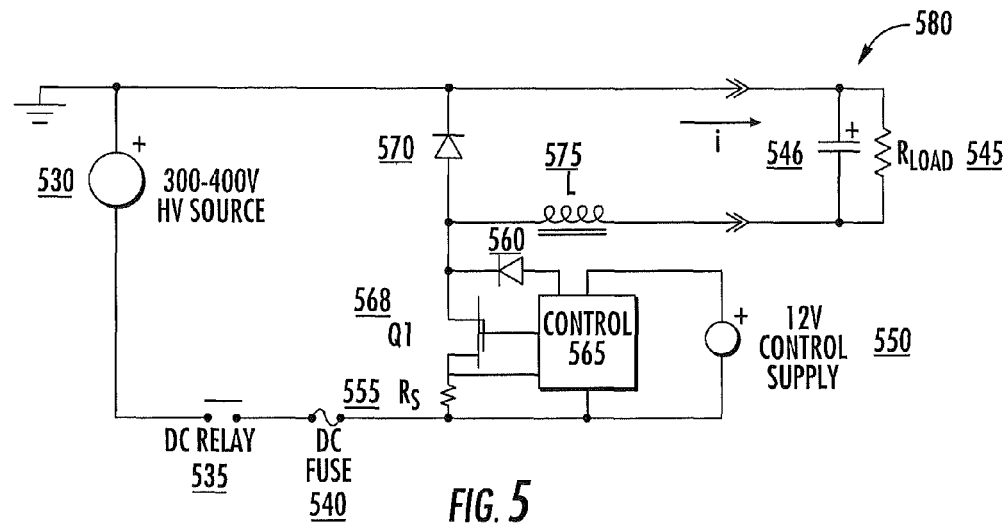
FIG. 5 is a circuit diagram illustrating an electronic current limiter circuit in accordance with some embodiments.

Referring now to FIG. 5, a circuit diagram illustrating an ECL circuit 580 in accordance with some embodiments will be discussed. As illustrated in FIG. 5, the ECL circuit 580 may include a 300 to 400V high voltage direct current source 530, a direct current relay 535, a direct current rate fuse 540, a 12V control supply 550, a control circuit 565 and a freewheeling diode for 570 for inductor 575 and MOSFET 568 connected to a load illustrated by, resistor (Rload) 545 in parallel with a capacitor 546. The elements of the ECL circuit 580 are connected as shown in FIG. 5.

Operations of the ECL circuit 580 in accordance with some embodiments will be discussed with respect to FIG. 5. The series MOSFET 568 and inductor 575 between the source 530 and the load are configured to provide inrush and arc control. In some embodiments, the inductor 575 is a relatively small inductor, for example, the inductor may be from about 2.0 µH to about 40 µH. During operation, when a connector is plugged into an outlet 115A-115D of FIG. 1 on the PDU 100, the peak current may be limited to an allowable value. In some embodiments, to limit the peak current to an allowable direct current, the MOSFET 568 is configured to be switched off at a first current magnitude threshold and energized at a second current magnitude threshold, lower than the first current magnitude threshold. The MOSFET 568 is configured to be monitored for desaturation and may be transferred to the switching mode for a predetermined period of time before a fault is signaled and the MOSFET 568 is switched off.

In some embodiments, the MOSFET 568 may be configured to be switched off periodically to force a current zero to extinguish any direct current arcs. The interruption may be for a short period of time at a low duty cycle. For example, the MOSFET 568 may be configured to be switched off about every about 0.1 s for about 10.0 µs. This brief interruption will extinguish an arc almost as soon as it starts.

Figure 7:
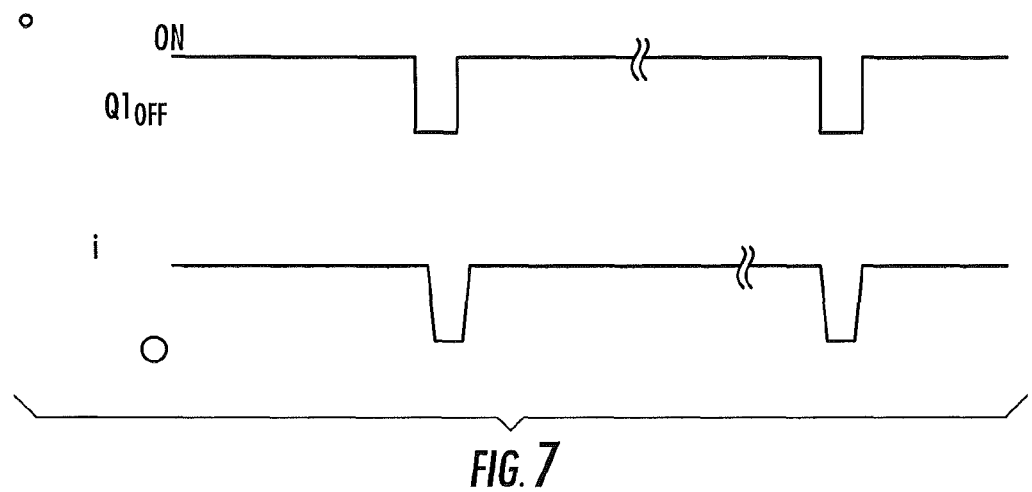
FIGS. 7 and 8 are diagrams illustrating conditions of a false break of the direct current in accordance with some embodiments.
Figure 8:
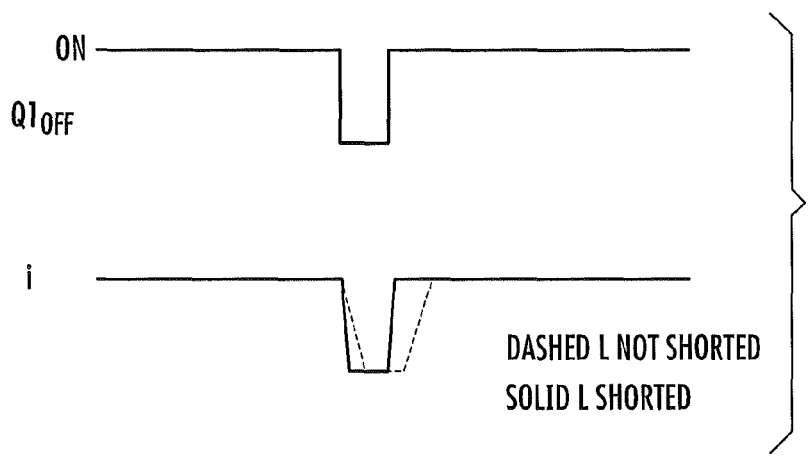

A problem that may arise from this brief interruption is that the inductor 575 may need to be discharged and recharged each time the interruption occurs. A diagram illustrating a result of a forced break of the direct current is illustrated in FIG. 7. The larger the inductor 575 used for controlling the currents, the greater the interruption time will be required to force the current to zero. To counter high inductance, in some embodiments, the inductor 575 may be configured to be shorted during the interruption of current. Thus, the current will continue to flow in the inductor windings and the value of the inductor 575 will drop so only leakage will be charged and discharged as illustrated in FIG. 8. After the interruption, the inductor short will be removed.

Figure 6:
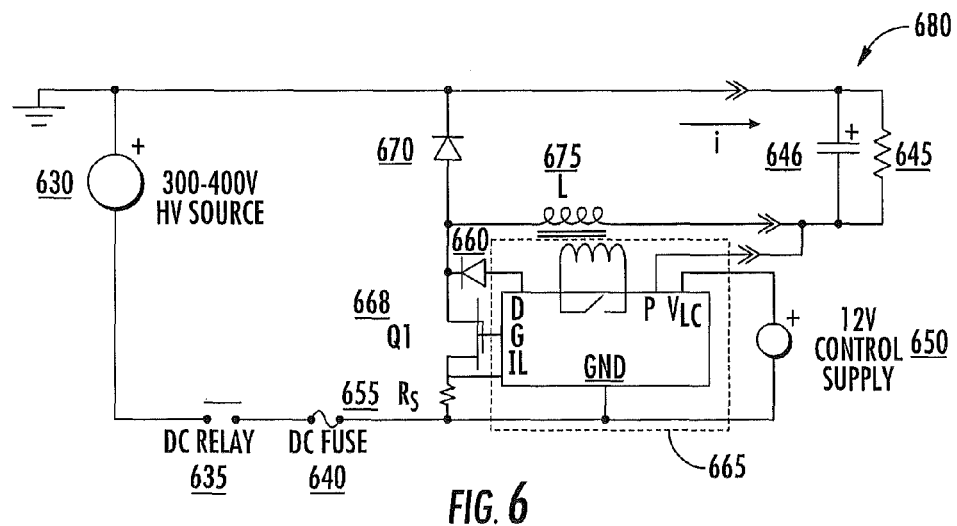
FIG. 6 is a more detailed circuit diagram illustrating an electronic current limiter circuit in accordance with some embodiments.

Referring now to FIG. 6, a more detailed circuit diagram illustrating an ECL circuit in accordance with some embodiments will be discussed. Like reference numerals refer to like elements throughout the specification, accordingly, details with respect to like elements will not be repeated in the interest of brevity. Accordingly, the details of the control 665 will be discussed with respect to FIG. 6.

In some embodiments, the MOSFET 668 can remain off until a connector is detected in the outlet 115A-115D. The presence of the connector in the outlet can be detected using many detection methods. For example, the connector may be configured to include a mechanical feature used to indicate the presence of the connector in the outlet. In some embodiments, the connector may include a pin that is specifically designated to indicate the presence of the connector in the outlet.

In further embodiments, the connector may include an additional connection that will mate-last and break-first indicating when the connector is plugged into or unplugged from, respectively, the outlet. For example, the mate-last/break-first pin may be connected to pin P of the control circuit 665. When the connector is detected as being unplugged, this will signal the MOSFET 668 to turn off, for example, when the additional mate-last/break first connection is opened.

In some embodiments, the MOSFET 668 is configured to be periodically monitored to determine if the MOSFET has failed. For example, the MOSFET 668 may be configured to be periodically monitored from about every 10.0 seconds to about every 1.0 minute. If it is determined that the MOSFET 668 has failed, the load may be de-energized using the direct current rated relay 635. Over current protection may be supplied by at least one direct current rated fuse 640 in series with the MOSFET 668. The duration and magnitude of the current during the inrush limiting and faults may be coordinated with the direct current rated fuse 640. In some embodiments, the MOSFET 668 is configured to maintain current inside a curve of the at least one direct current rated fuse to prevent the direct current fuse from opening when the MOSFET is operational.

Although the ECL circuit 580,680 of FIGS. 5 and 6, respectively, include a positive grounded DC supply, embodiments of the present invention are not limited to this configuration. For example, the ECL circuit could be implemented using a negative grounded DC supply with the appropriate rearrangement of components without departing from the scope of the present inventive subject matter.

Figure 13:
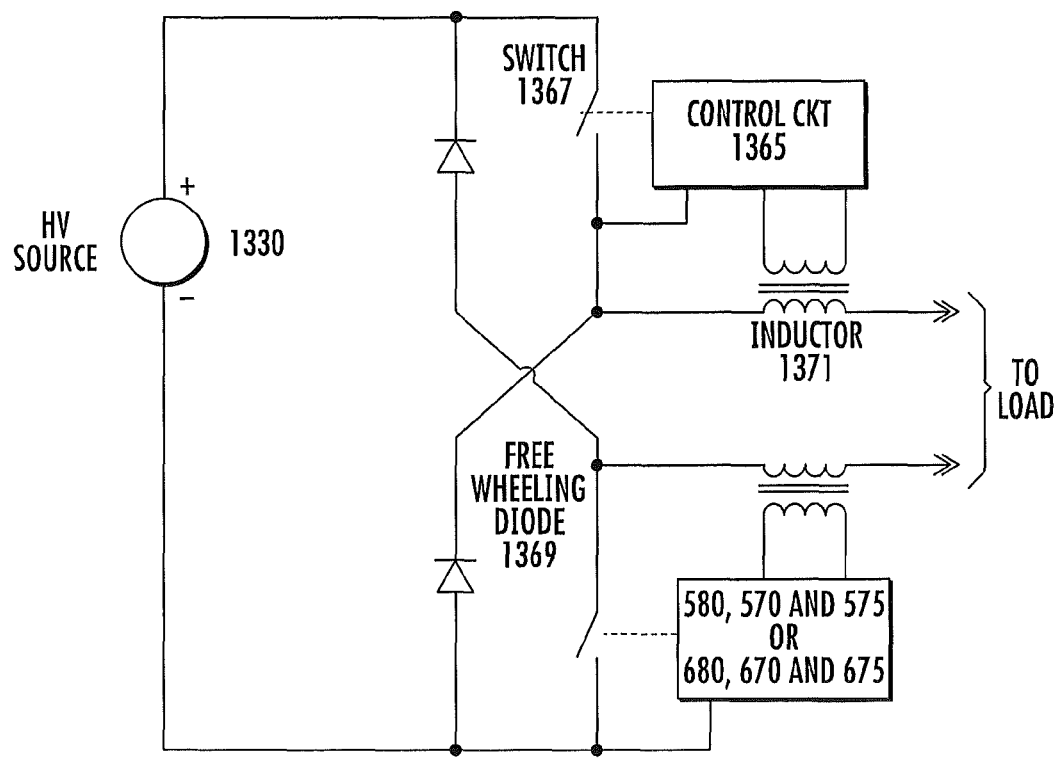
FIG. 13 is a block diagram illustrating some embodiment having control circuits on both the positive and negative leads of a DC source in accordance with some embodiments of the present inventive concept.

Although embodiments of the present invention are discussed with respect to a single electronic limiter circuit, i.e. a positive lead of the DC source 530, 630 is grounded, it will be understood that embodiments of the present invention are not limited to this configuration. In particular, in embodiments illustrated in, for example, FIGS. 5 and 6, only a single switch is needed to protect the load from DC arcs as discussed herein. However, when the ground point is removed or moved to another location, a switch is needed on both the positive and negative leads of the DC source 530, 630. Thus, in these embodiments illustrated in, for example, in FIG. 13, a switch 1367, freewheeling diode 1369, inductor 1371 and a control circuit 1365 are also provided couple to the positive lead of the DC source 1330. It will be understood that the configuration illustrated in FIG. 13 is provided for exemplary purposes only and that embodiments are not limited to this configuration. Accordingly, two or more loads (devices) connected to the DC source 1330 may be protected from DC arcs in accordance with embodiments of the present invention.

Referring again to FIG. 6, in some embodiments, current sensing may be provided using resistor $R_S$ 655. Use of the resistor 655 in this manner may increase the number of watts and can be effectively replaced by monitoring drain to source voltage of Q1 MOSFET 668. For example, a drain to source voltage of the MOSFET 668 may be monitored and a current level in the MOSFET 668 may be estimated when the drain to source voltage exceeds a predetermined level, less than the desaturation point. The desaturation may be monitored using pin D of the control circuit 665. The MOSFET 668 may be desaturated responsive to a sensed overload based on the estimated current level. A current limiting burst may be triggered for a predetermined time, the current limiting burst being configured such that a direct current fuse associated with the outlet does not open. The MOSFET 668 may be switched off if the predetermined time is reached and a fault may be signaled responsive to switching off the MOSFET 668.

Figure 9:
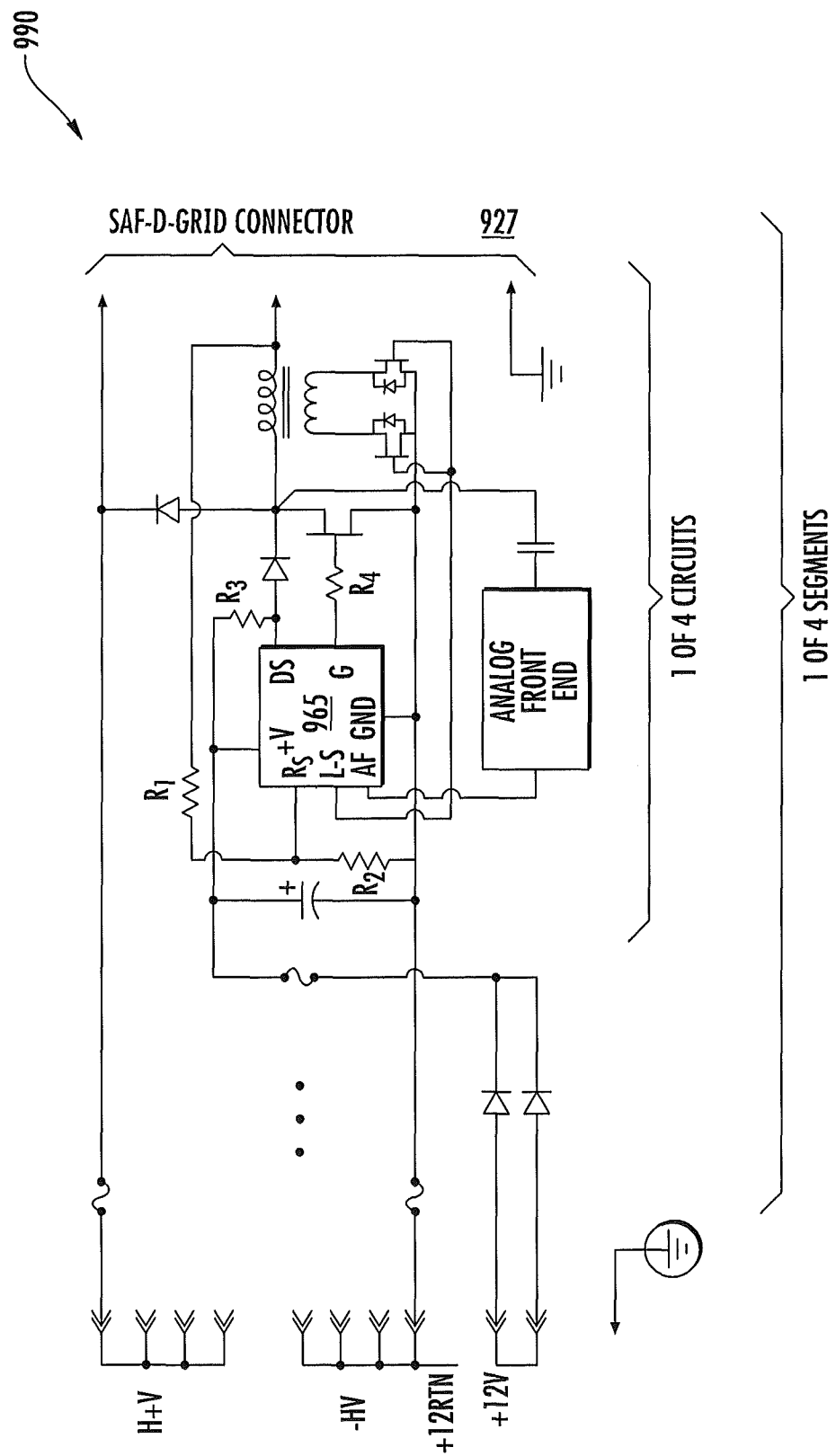
FIG. 9 is a circuit diagram illustrating an electronic current limiter circuit in accordance with some embodiments.

Referring now to FIG. 9, a circuit diagram illustrating ECL circuits 990 in accordance with some embodiments will be discussed. As discussed above, the ECL circuit is configured to limit current inrush to predictable values and isolate any fault or excess current draw in the load connected to an outlet. This may also reduce the likelihood or possibly prevent a load fault from notching the DC bus and the potential interruption of other parallel connected loads. Thus, the ECL circuit is needed because of the limited fault current and time to clear a fuse or circuit breaker in high voltage direct current systems. Without the fault isolation provided by the ECL circuit, a fault could shutdown the system by notching the DC bus.

As discussed above, each outlet on a PDU has an associated ECL circuit 990. Each PDU may have multiple segments, for example, four, and each segment may have multiple outlets, for example, four. In some embodiments, the outlet may be an Anderson Power Products® Saf-D-Grid brand DC Receptacle and the connector may be a Saf-D-Grid connector 927 that is configured to plug into the outlet. The ECL circuit may be configured to operate like a circuit breaker. As discussed above, the ECL provides current limiting using a MOSFET in series with an inductor in response to desaturation (DS) of the MOSFET. The ECL circuit may also be configured to monitor the load for DC arc faults and disconnect them.

The control circuit 965 of the ECL circuit of FIG. 9 includes a reset input (RS). When the circuit is tripped for an arc fault or over-current, the RS input is configured to indicate that the load is still attached. Upon removal of the load, the circuit will reset by closing or turning on the MOSFET.

As further illustrated in FIG. 9, the control circuit 965 further includes a DESAT (DS) input. When the DESAT input senses a rise in drain to source voltage to about 0.3V, the gate drive is turned off for about 10.0 us and CLOSE (gate drive ON). Blanking time after the gate drive is turned on is about 100 ns. DESAT repetition rate is greater than COUNT=10, LATCH OFF. Down count is 1 count per second and stops at zero. LATCH OFF will be cleared when RS indicates the load is removed.

As further illustrated in FIG. 9, the control circuit 965 of FIG. 9 further includes an ARC FAULT (AF) input. In some embodiments, direct current arc may be measured from $R_{dson}$ of the MOSFET. It may be AC coupled to gain stage, active band-pass filtered, rectified and enveloped detection and finally to threshold comparator. Frequencies may include from about 5.0 kHz to about 15.0 kHz and 15 db from background. It will be understood that there can be individual frequencies from power converters of a magnitude to trip the circuit, but the circuit may be configured to discriminate between normal frequencies and arc faults to prevent false trips of the system.

As discussed above, in some embodiments the inductor is shorted. The control circuit of FIG. 9 includes an L-short input. The inductor is configured to control the rate of rise of current. A parallel winding of the inductor may be shorted to reduce the apparent value of the inductor in certain conditions. For example, in response to an arc fault (AF), the inductor winding may be shorted and the main MOSFET may be opened for about 1.0 to about 4.0 μs to quench the arc. At the end of the time period, the MOSFET is closed and the short is removed on the inductor winding. If an arc fault is detected, the MOSFET is opened and then the system waits for load removal.

Details with respect to specific embodiments of the present inventive subject matter will be discussed, however, it will be understood that embodiment of the present invention are not limited to this configuration. Some embodiments discussed herein use a low pin-count PIC® Flash microcontroller, for example, PIC16F690, a rail-to-rail input and output voltage feedback amplifier, such as LMH6646, and MOSFETS (main), such as, ST parts STY112N65M5 or STW77N65M5.

As discussed above, there are four circuits per segment and each circuit has a MOSFET, inductor and output receptacle. The MOSFET is insulated and the PDU case is the heat sink. The inductor is potted, insulated and the PDU case is the heat sink. The PDU case may be serrated on the outside to increase the surface area.

In some embodiments, each segment may be protected by a pair of DC rated fuses, for example, Fuseholder Ferraz Shawmut type USM2 (2-pole for Midget 1½"×13/32" DC rated fuses), such as ATM20 or ATM30. Each section is wired back to the Power shelf with individual 10 AWG wires. Power for the control circuit can be supplied from the Power Shelf or derived locally without departing from the scope of the present inventive subject matter. Some embodiments of the present invention use flexible metallic conduit.

Figure 10A:
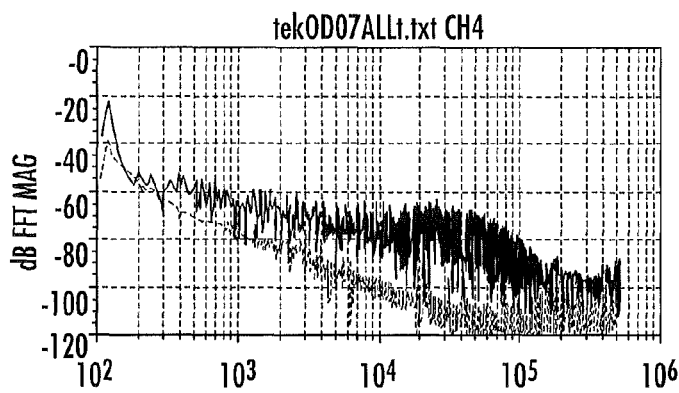
FIGS. 10A through 10C are graphs illustrating examples of normal and arc fault currents in accordance with some embodiments.
Figure 10B:
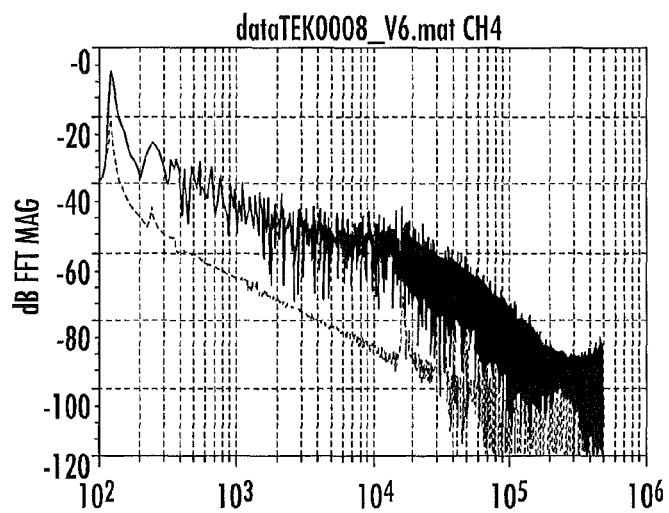
Figure 10C:
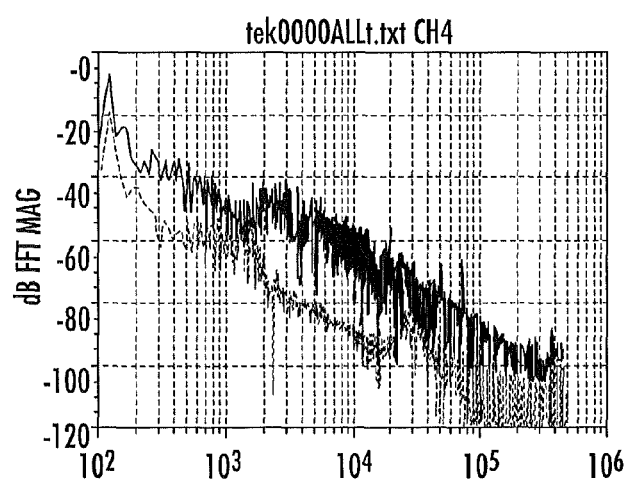

Referring now to FIGS. 10A through 10C, graphs illustrating normal and arc fault currents in accordance with some embodiments are illustrated. Note the broadband nature of the fault and the possibilities of narrowband noise from inverters or converters on the DC bus.

There are series arc faults, where the arc voltage will reduce the voltage seen by the load. If the load is constant current, the current will rise. The spectrum will be broad band. To identify the arc signature two ranges of frequency below 15 kHz have been selected, 2 kHz and 8 kHz. There must be a signal in both ranges to declare an arc fault (series).

The parallel arc fault will cause a significant increase in current. The MOSFET device will most likely de-saturate. The over-current must be qualified as an arc fault and not charging of load capacitors. The charging of load capacitors will cause the MOSFET to de-saturate for a finite period of time. The arc fault will either be intermittent or sustained beyond the time to charge load capacitors. The intermittent de-saturation of the MOSFET will be addressed by counting de-saturation events to a maximum and down count very slowly if the maximum was not reached, for example, 20 counts maximum and down counting 1 count per second.

Figure 11:
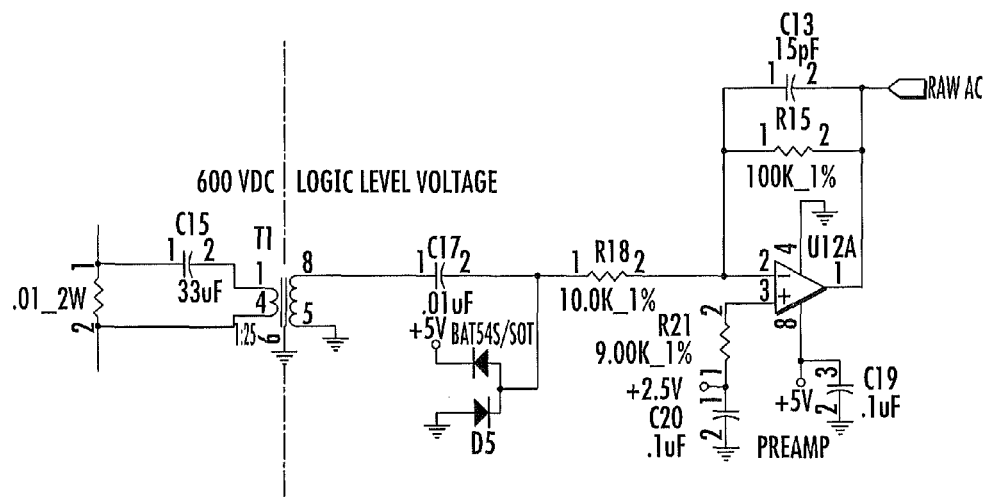
FIG. 11 is a circuit diagram illustrating a preamp circuit in accordance with some embodiments.

FIG. 11 is a circuit diagram illustrating a preamp circuit in accordance with some embodiments. The 0.01 Ohm sense resistor may be the Rdson of MOSFET. Protection may be required for input when the MOSFET is in switching mode. Since there is an inductor in series with the load and arc noise, the arc noise that will be seen at the Rdson may be evaluated by simulation.

Figure 12:
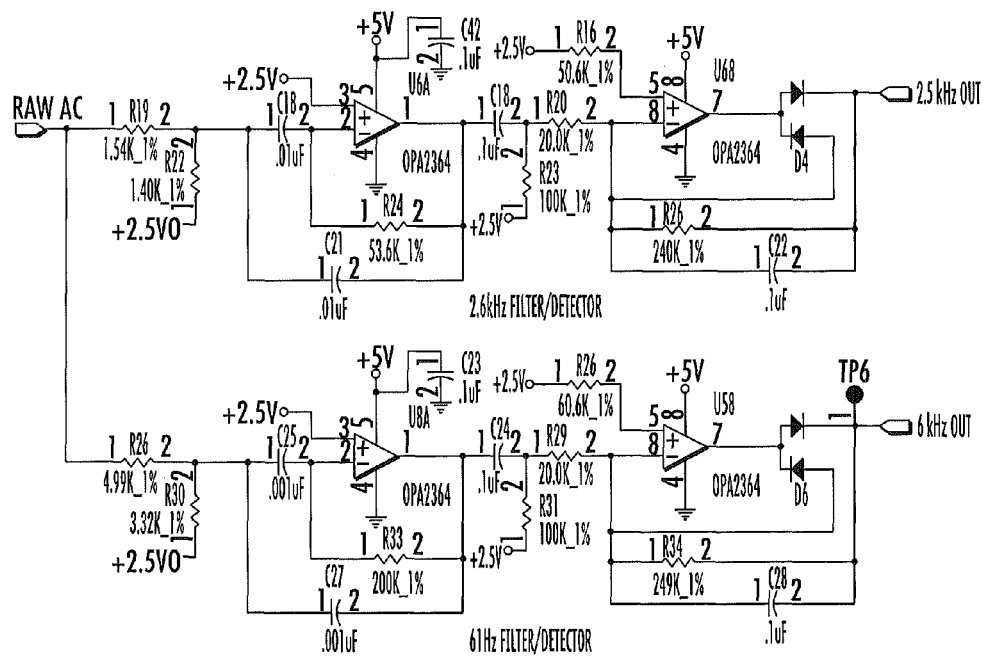
FIG. 12 illustrates circuit diagrams illustrating 2.0 kHz and 8.0 kHz filters with envelope detection in accordance with some embodiments.

FIG. 12 is a diagram illustrating circuit diagrams illustrating 2.0 kHz and 8.0 kHz filters with envelope detection in accordance with some embodiments. Both the filter outputs will go to Micro controller (PIC) separately to level threshold comparator circuits. A true output on both of the filters is criterion for arc fault action.

Figure 14:
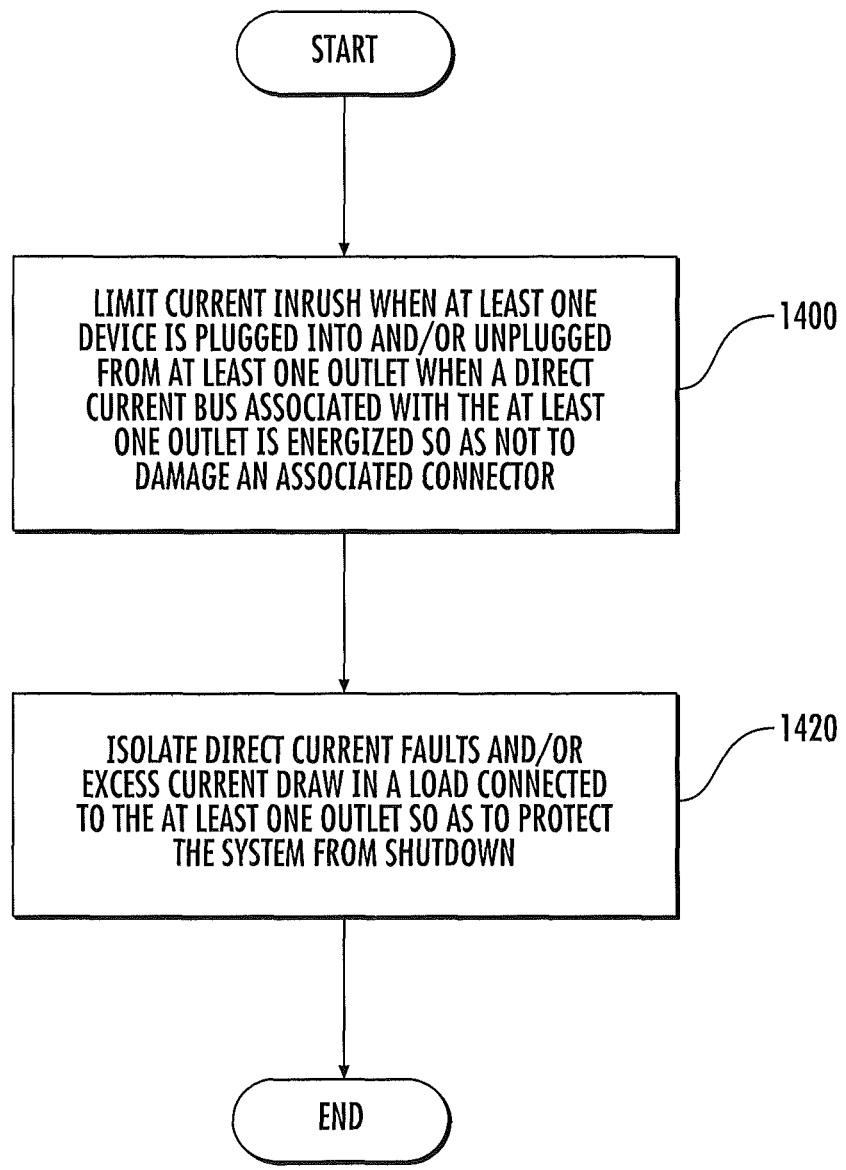
FIGS. 14-16 are flowcharts illustrating various operations of a high voltage direct current system in accordance with some embodiments.

Operations of an ECL circuit in accordance with some embodiments of the present inventive subject matter will now be discussed with respect to the flowcharts of FIGS. 14 through 16. Referring first to FIG. 14, operations begin at block 1400 by limiting current inrush when a device is plugged into and/or unplugged from an outlet when a direct current bus associated with the outlet is energized so as not to damage an associated connector. Direct current faults and/or excess current draw are isolated in a load connected to the outlet so as to protect the system from shutdown (block 1420).

Figure 15:
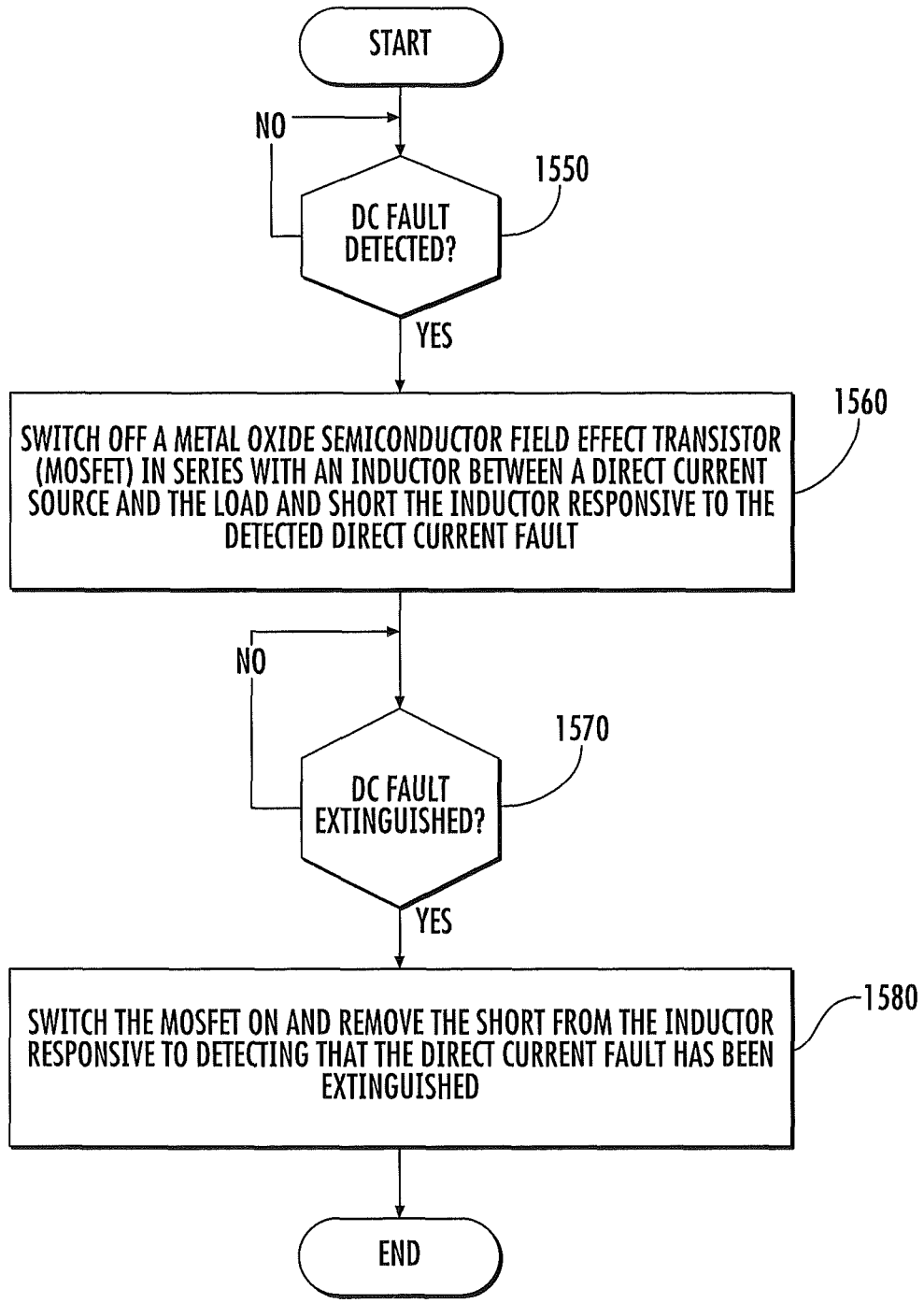

Referring now to FIG. 15, operations begin by determining if a direct current fault has occurred (block 1550). If it is determined that a direct current fault has not occurred (block 1550), then operations remain at block 1550 until a direct current fault is detected. If it is determined that a direct current fault has occurred (block 1550), operations proceed to block 1560 where the MOSFET in series with the inductor between the direct current source and the load is turned off and the inductor is shorted to reduce load interruption time caused by the extinguishing the detected direct current fault. It is then determined if the direct current fault has been extinguished (block 1570). If the fault has not been extinguished, operations remain at block 1560 until it is determined that the fault has been extinguished (block 1570). If, on the other hand, it is determined that the fault has been extinguished (block 1570), operations proceed to block 1580 where the MOSFET is switched back on and the short is removed from the inductor. Accordingly, an interruption to the load can be reduced while the fault is cleared.

Figure 16:
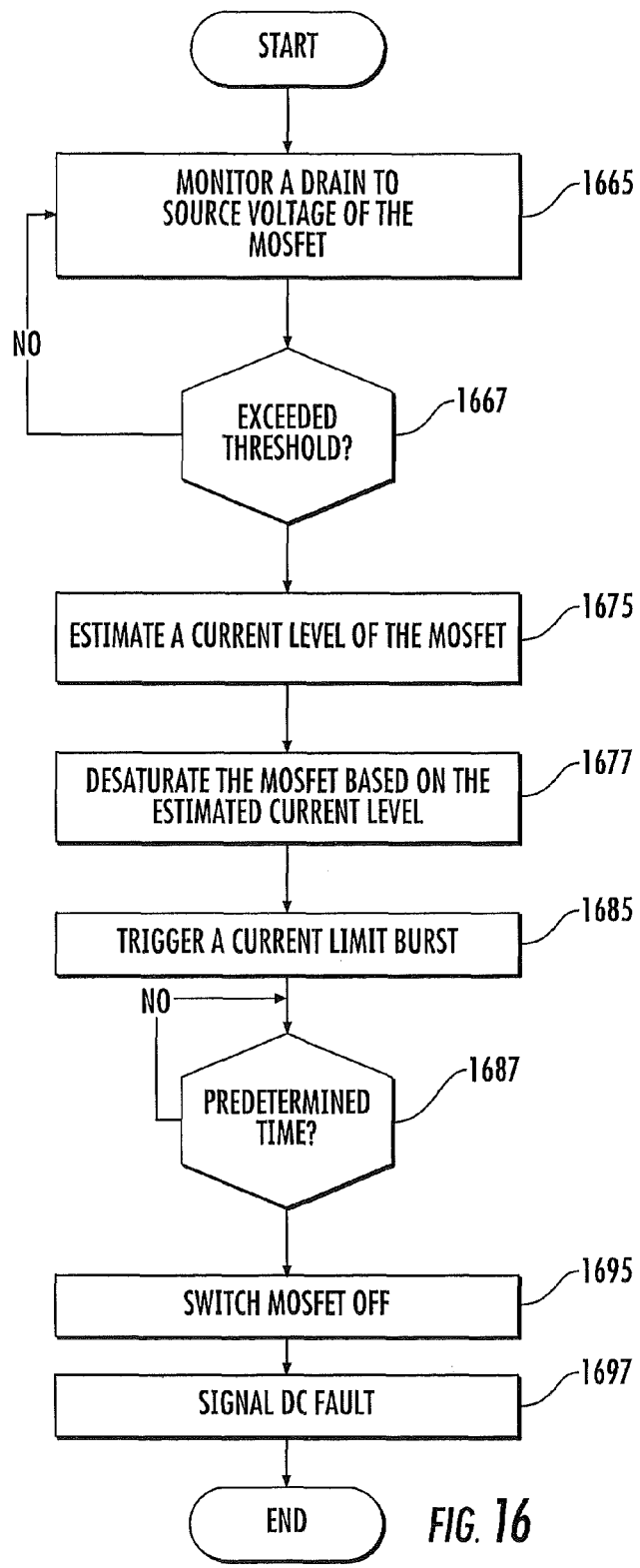

Referring now to FIG. 16, operations begin at block 1665 by monitoring a drain to source voltage of the MOSFET. It is determined if the drain to source voltage has exceeded a predetermined level, less than the desaturation point (block 1667). If it is determined that the threshold has not been exceeded (block 1667), operations remain at block 1665 until it is determined that the threshold has been exceeded (block 1667). If it is determined that the threshold had been exceeded, a current level in the MOSFET is estimated (block 1675). The MOSFET is desaturated responsive to a sensed overload based on the estimated current level (block 1677). A current limiting burst is triggered for a predetermined time, the current limiting burst configured such that a direct current fuse associated with the at least one outlet does not open (block 1685).

It is determined if the predetermined time has been reached (block 1687). If it is determined that the predetermined time has not been reached (block 1687), operations remain at block 1685 until it is determined that the predetermined time has been reached (block 1687). If it is determined that the predetermined time has been reached, the MOSFET is switched off (block 1695) and a fault is signaled responsive thereto (block 1697).

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A high voltage direct current system comprising:
    at least one outlet; and
    an electronic current limiter circuit associated with the at least one outlet, the electronic current limiter circuit configured to:
        limit current inrush when a connector is plugged into and/or unplugged from the at least one outlet when a direct current bus associated with the at least one outlet is energized so as not to damage the connector; and/or
        isolate direct current faults and/or excess current draw in a load connected to the at least one outlet so as to protect the system from shutdown,
    wherein the electronic current limiter circuit comprises a switching device;
    wherein the switching device is provided in series with an inductor between a direct current source and the load; and
    wherein the switching device is configured to be periodically monitored to determine if the switching device has failed.

2. The high voltage direct current system of claim 1, further comprising a power distribution unit including the at least one outlet.

3. The high voltage direct current system of claim 2, wherein the at least one outlet comprises two or more outlets each having an associated electronic current limiter circuit.

4. The high voltage direct current system of claim 1, wherein the switching device comprises a metal oxide semiconductor field effect transistor (MOSFET) in series with the inductor between the direct current source and the load.

5. The high voltage direct current system of claim 4, wherein, responsive to detection of the direct current fault, the MOSFET is configured to be switched off and the inductor is configured to be shorted such that a load interruption time caused by extinguishing the direct current fault can be reduced.

6. The high voltage direct current system of claim 5, wherein, responsive to an indication that the direct current fault has been extinguished, the MOSFET is configured to be switched on and the short is removed from the inductor.

7. The high voltage direct current system of claim 6, wherein the MOSFET is configured to be switched off periodically to force a current zero.

8. The high voltage direct current system of claim 7, wherein the MOSFET is configured to be switched off about every 0.1 s for about 10.0 μs.

9. The high voltage direct current system of claim 6, wherein the MOSFET is configured to remain off until a connector is detected in the at least one outlet.

10. The high voltage direct current system of claim 4, wherein the MOSFET is configured to be on until a fault is detected and wherein the MOSFET is configured to be reset by unplugging the connector from and replugging the connector into the at least one outlet.

11. The high voltage direct current system of claim 4, wherein the MOSFET is configured to be switched off at a first current magnitude threshold and energized at a second current magnitude threshold, lower than the first current magnitude threshold, to limit the peak current to an allowable direct current.

12. The high voltage direct current system of claim 1, wherein the MOSFET is configured to be monitored for desaturation and to be transferred to a switching mode for a predetermined period of time before a fault is signaled.

13. The high voltage direct current system of claim 4, wherein the MOSFET is configured to be periodically monitored from about every 10.0 seconds to about every 1.0 minute.

14. The high voltage direct current system of claim 4, wherein the system is further configured to:
    monitor a drain to source voltage of the MOSFET;
    estimate a current level in the MOSFET when the drain to source voltage exceeds a predetermined level, less than the desaturation point;
    desaturate the MOSFET responsive to a sensed overload based on the estimated current level;
    trigger a current limiting burst for a predetermined time, the current limiting burst configured such that a direct current fuse associated with the at least one outlet does not open;
    switch the MOSFET off if the predetermined time is reached; and
    signal a fault responsive to switching off the MOSFET.

15. The high voltage direct current system of claim 4, wherein the inductor is from about 2.0 μH to about 40 μH.

16. The high voltage direct current system of claim 15, wherein the inductor is configured to be shorted and the MOSFET is configured to be opened for about 1.0 to about 4.0 μs when a fault is detected to quench the arc.

17. The high voltage direct current system of claim 16:
    wherein the at least one switch comprises first and second switches and the at least one control circuit comprises first and second control circuits;
    wherein the first switch and the first control circuit are coupled to the positive lead of the direct current source; and
    wherein the second switch and the second control circuit are coupled to the negative lead of the direct current source.

18. The high voltage direct current system of claim 17, wherein the system comprises at least two devices in series with the load.

19. The high voltage direct current system of claim 4, further comprising a direct current rated relay, wherein when a failure of the MOSFET is detected the load is de-energized using the direct current rated relay.

20. The high voltage direct current system of claim 19, further comprising at least one direct current rated fuse, the at least one direct current rated fuse being positioned in series with the MOSFET.

21. The high voltage direct current system of claim 20, wherein the at least one direct current rated fuse comprises a pair of direct current rated fuses associated with each of the at least one outlet/electric current limiter circuit pairs.

22. The high voltage direct current system of claim 20, wherein the MOSFET is configured to maintain current inside a curve of the at least one direct current rated fuse to prevent the direct current fuse from opening when the MOSFET is operational.

23. The high voltage direct current system of claim 1, wherein the connector is configured to be received by the at least one outlet and includes guarded contacts so as to reduce damage to the contacts when the connector is plugged into and/or unplugged from the at least one outlet.

24. A high voltage direct current system, the system comprising:
a direct current source having a positive and negative lead; and
an electronic current limiter circuit coupled to the positive and/or the negative lead of the direct current source and including at least one switch and at least one control circuit, the electronic current limiter circuit configured to:
limit current inrush when a connector is plugged into and/or unplugged from at least one outlet when a direct current bus associated with direct current source is energized so as not to damage the connector; and/or
isolate direct current faults and/or excess current draw in a load connected to the at least one outlet so as to protect the system from shutdown,
wherein the electronic current limiter circuit comprises a switching device;
wherein the switching device is provided in series with an inductor between a direct current source and the load; and
wherein the switching device is configured to be periodically monitored to determine if the switching device has failed.

25. A method of controlling arcs in a direct current high voltage system using an electronic current limiter circuit, the method comprising:
limiting current inrush when at least one device is plugged into and/or unplugged from at least one outlet when a direct current bus associated with the outlet is energized so as not to damage an associated connector; and/or
isolating direct current faults and/or excess current draw in a load connected to the at least one outlet so as to protect the system from shutdown,
wherein the electronic current limiter circuit comprises a switching device;
wherein the switching device is provided in series with an inductor between a direct current source and the load; and
periodically monitoring the switching device to determine if the switching device has failed.

26. The method of claim 25, further comprising:
detecting the direct current fault; and
switching off a metal oxide semiconductor field effect transistor (MOSFET) in series with an inductor between a direct current source and the load and shorting the inductor responsive to the detected direct current fault to reduce load interruption time caused by the extinguishing the detected direct current fault.

27. The method of claim 26, further comprising:
detecting that the direct current fault has been extinguished; and
switching the MOSFET on and removing the short from the inductor responsive to detecting that the direct current fault has been extinguished.

28. The method of claim 25, wherein the switching device comprises a metal oxide semiconductor field effect transistor (MOSFET) and wherein periodically monitoring comprises periodically monitoring the MOSFET of the electronic current limiter circuit to determine if the MOSFET has failed.

29. The method of claim 28, wherein monitoring the MOSFET comprises periodically monitoring the MOSFET from about every 10.0 seconds to about every 1.0 minute.

30. The method of claim 28, further comprising:
detecting a failure of the MOSFET; and
de-energizing the load when the failure of the MOSFET is detected.

31. The method of claim 25, further comprising:
monitoring a drain to source voltage of the MOSFET;
estimating a current level in the MOSFET when the drain to source voltage exceeds a predetermined level, less than the desaturation point;
desaturating the MOSFET responsive to a sensed overload based on the estimated current level;
triggering a current limiting burst for a predetermined time, the current limiting burst configured such that a direct current fuse associated with the at least one outlet does not open;
switching the MOSFET off if the predetermined time is reached; and
signaling a fault responsive to switching off the MOSFET.

* * * * *

UNITED STATES PATENT AND TRADEMARK OFFICE
CERTIFICATE OF CORRECTION

PATENT NO. : 9,036,315 B2  
APPLICATION NO. : 14/268072  
DATED : May 19, 2015  
INVENTOR(S) : Johnson, Jr.

Page 1 of 1

It is certified that error appears in the above-identified patent and that said Letters Patent is hereby corrected as shown below:

In the Claims:
Column 12, Claim 12, Line 29: Delete "of claim1,"
Insert -- of claim 11, --

Signed and Sealed this
Ninth Day of February, 2016

Michelle K. Lee
*Director of the United States Patent and Trademark Office*